UNITED STATES PATENT OFFICE.

LEVERETT L. MAXFIELD, OF NEW YORK, N. Y., ASSIGNOR TO JACOB WALLACE, TRUSTEE, OF SAME PLACE.

COATING OR LINING VESSELS.

SPECIFICATION forming part of Letters Patent No. 332,160, dated December 8, 1885.

Application filed May 23, 1885. Serial No. 166,487. (No specimens.)

*To all whom it may concern:*

Be it known that I, LEVERETT L. MAXFIELD, a citizen of the United States, and a resident of New York, in the county of New York and State of New York, have invented certain new and useful Improvements in Coating or Lining Vessels, of which the following is a specification.

My invention relates to the rendering of pails, casks, and other vessels and utensils proof against absorption, leakage, and decay.

The object of the invention is to provide a lining, coating, or covering which will not only be water-proof or liquid-resisting, so as to prevent absorption, leakage, and decay, but which at the same time, in the case of casks, &c., will not impart to the contents of the vessel anything offensive to taste or smell.

My invention consists in the utilization of the natural wax known as "ozocerite" for the lining, coating, or covering of vessels and utensils.

Attempts have heretofore been made to coat or line vessels and utensils, and various compounds have been devised for such purpose; but these compounds have generally been composed of such bituminous, resinous, or silicious substances as are objectionable, for the reason that they impart to the contents of the vessels and utensils an unpleasant odor or taste, and in many cases destroy the commercial value of their contents, while the principal objection to some of them—particularly the silicious compounds or coatings—is that in the handling or rough usage of the vessels or utensils such compound is liable to crack or fracture.

In carrying out my invention I take the ozocerite and subject it to heat or to solvents, by either method liquefying it, and in that condition apply it to the interior or exterior of the vessels or utensils, or both, by any of the usual methods until a sufficient body or coating is deposited thereon, or a sufficient saturation, when desired, is secured.

The waterproofing qualities of ozocerite are excellent, and as it is free from taste or smell, and also not liable to discolor liquids, and when applied will not easily crack or scale, it therefore fulfills all the requirements of an excellent water-repellent lining or coating for the purposes desired.

I do not confine myself to any particular kind of vessel or utensil, as receptacles of all kinds in which liquid may be kept can be made impervious to water and air by the use of my discovery.

The material herein described is specially adapted for lining or coating the inside of beer and ale barrels, casks, or tanks, as it will not affect the taste or color of the contents.

Having thus described my invention, what I claim as new, and desire to secure by Letters Patent, is—

1. As a saturating or coating material for vessels and utensils to render them water-repellent and incapable of absorption, the natural wax known as "ozocerite."

2. A vessel or utensil saturated or coated with the natural wax known as "ozocerite," substantially as described.

Signed at New York, in the county of New York and State of New York, this 19th day of May, A. D. 1885.

LEVERETT L. MAXFIELD.

Witnesses:
  HUGO KOELKER,
  J. E. M. BOWEN.